United States Patent
Aoki

(10) Patent No.: US 12,329,139 B2
(45) Date of Patent: Jun. 17, 2025

(54) FISHHOOK HOLDER

(71) Applicant: GEECRACK USA INC., Corinth, TX (US)

(72) Inventor: Kunimitsu Aoki, Gifu (JP)

(73) Assignee: GEECRACK USA INC.

( * ) Notice: Subject to any disclaimer, the term of this patent is extended or adjusted under 35 U.S.C. 154(b) by 0 days.

(21) Appl. No.: 17/877,078

(22) Filed: Jul. 29, 2022

(65) Prior Publication Data
US 2023/0042002 A1    Feb. 9, 2023

(30) Foreign Application Priority Data
Aug. 6, 2021    (JP) .................................. 2021-129523

(51) Int. Cl.
*A01K 83/06*    (2006.01)
*A01K 85/00*    (2006.01)

(52) U.S. Cl.
CPC .......... *A01K 83/064* (2022.02); *A01K 83/06* (2013.01); *A01K 85/1811* (2022.02); *A01K 85/1831* (2022.02)

(58) Field of Classification Search
CPC .... A01K 83/06; A01K 83/061; A01K 83/063; A01K 83/064; A01K 85/00; A01K 85/1811; A01K 85/1831
USPC ........ 43/44.2, 44.4, 44.6, 44.8, 42.24, 42.37
See application file for complete search history.

(56) References Cited

U.S. PATENT DOCUMENTS

| 531,140 | A | * | 12/1894 | Stapp | A01K 83/06 43/44.8 |
| 608,348 | A | * | 8/1898 | Stadel | A01K 83/06 43/44.6 |
| 1,807,870 | A | * | 6/1931 | Pemberton | A01K 85/14 43/42.24 |
| 2,017,333 | A | * | 10/1935 | Zuck | A01K 83/06 43/42.47 |

(Continued)

FOREIGN PATENT DOCUMENTS

| EP | 0483779 A1 * | 5/1992 | |
| GB | 2373700 A * | 10/2002 | A01K 83/06 |

(Continued)

OTHER PUBLICATIONS

Notice of Reasons for Refusal of the Japan Patent Office in related Japanese Appl. No. 2021-129523, dated Apr. 8, 2025, 6 pages.

*Primary Examiner* — Darren W Ark
(74) *Attorney, Agent, or Firm* — Bochner PLLC; Andrew Bochner; Eric Kleinertz

(57) ABSTRACT

A fishhook holder 10 is configured to hold a fishhook against a soft lure and is made of a resin material, and includes a base 20 configured to contact an outer surface of the soft lure and a tapered shaft 30 protruding from the base 20 and configured to extend through the soft lure. The shaft 30 includes a basal end 30a coupled to the base 20, a distal end 30b opposite the basal end 30a in an axial direction of the shaft 30, an insertion hole 31 located between the basal end 30a and the distal end 30b and configured such that the fishhook extends through the insertion hole 31, and a mark 33 located between the insertion hole 31 and the distal end 30b and indicating a reference position in a case where a portion including the distal end 30b is cut off from the shaft 30.

9 Claims, 3 Drawing Sheets

(56) References Cited

U.S. PATENT DOCUMENTS

| | | | | |
|---|---|---|---|---|
| 2,565,956 | A * | 8/1951 | Duhamel | A01K 83/06 43/44.4 |
| 2,668,387 | A * | 2/1954 | Gallardo | A01K 83/06 43/44.4 |
| 2,821,046 | A * | 1/1958 | Fisk | A01K 83/06 D22/128 |
| 2,836,922 | A * | 6/1958 | Cox | A01K 83/06 43/44.2 |
| 2,880,545 | A * | 4/1959 | Stadler | A01K 97/06 43/44.2 |
| 2,922,247 | A * | 1/1960 | Buss | A01K 83/00 43/44.8 |
| 3,284,945 | A * | 11/1966 | Kurtis | A01K 83/06 43/44.2 |
| 3,377,734 | A * | 4/1968 | Snow | A01K 85/16 43/42.38 |
| 3,465,466 | A * | 9/1969 | Showalter | A01K 83/06 43/44.8 |
| 3,624,950 | A * | 12/1971 | Merckes | A01K 83/06 43/44.2 |
| 3,803,747 | A * | 4/1974 | Cartwright | A01K 85/00 43/44.81 |
| 3,905,149 | A * | 9/1975 | McCloud | A01K 83/06 43/44.8 |
| 3,940,870 | A * | 3/1976 | Pettersen | A01K 83/06 43/44.2 |
| 4,349,979 | A * | 9/1982 | Strantz | A01K 83/06 43/44.8 |
| 4,470,217 | A * | 9/1984 | Adams | A01K 83/00 43/44.8 |
| 4,653,212 | A * | 3/1987 | Pixton | A01K 85/00 D22/127 |
| 4,850,132 | A * | 7/1989 | Motyka | A01K 83/06 43/44.2 |
| 5,117,575 | A * | 6/1992 | Desmond | A01K 83/06 43/44.4 |
| 5,230,178 | A * | 7/1993 | Dillard | A01K 85/01 43/42.31 |
| 5,335,443 | A * | 8/1994 | Grigsby, Jr. | A01K 85/00 43/44.89 |
| 5,673,508 | A * | 10/1997 | Snyder | A01K 83/00 43/44.8 |
| 5,890,317 | A * | 4/1999 | Hollomon | A01K 85/00 43/42.31 |
| 7,971,387 | B2 * | 7/2011 | Huddleston | A01K 85/00 43/44.8 |
| 7,980,021 | B2 * | 7/2011 | Siatkowski | A01K 83/06 43/44.8 |
| 9,253,966 | B2 * | 2/2016 | Scholfield | A01K 85/01 |
| 9,485,973 | B2 * | 11/2016 | Burke | A01K 83/06 |
| 9,814,221 | B2 * | 11/2017 | Merritt | A01K 95/00 |
| 10,757,925 | B1 * | 9/2020 | Ward | A01K 85/02 |
| 11,612,152 | B1 * | 3/2023 | Price | A01K 83/06 43/41 |
| 2005/0246941 | A1 * | 11/2005 | Mitchell | A01K 85/01 43/42.39 |
| 2006/0162232 | A1 * | 7/2006 | Allen | A01K 85/00 43/42.36 |
| 2007/0144055 | A1 * | 6/2007 | Warczok | A01K 85/00 43/42.49 |
| 2008/0155883 | A1 * | 7/2008 | Corbitt | A01K 85/00 43/42.31 |
| 2008/0168700 | A1 * | 7/2008 | Kim | A01K 85/00 43/42.24 |
| 2008/0216384 | A1 * | 9/2008 | Hockmeyer | A01K 85/00 43/42.24 |
| 2012/0216443 | A1 | 8/2012 | Merritt | |
| 2013/0047490 | A1 * | 2/2013 | Gilmore | A01K 83/06 43/42 |
| 2013/0318859 | A1 * | 12/2013 | Kusmerz | A01K 83/06 43/44.81 |
| 2014/0345185 | A1 * | 11/2014 | Marlin | A01K 85/00 43/42.24 |
| 2017/0099819 | A1 * | 4/2017 | Merritt | A01K 85/00 |
| 2018/0077913 | A1 * | 3/2018 | Merritt | A01K 95/00 |
| 2018/0098529 | A1 * | 4/2018 | de Sousa | A01K 83/06 |
| 2018/0177170 | A1 * | 6/2018 | Tucker | A01K 85/00 |
| 2018/0310537 | A1 * | 11/2018 | Martin | A01K 97/045 |
| 2019/0216066 | A1 * | 7/2019 | Nitta | A01K 83/06 |
| 2019/0357509 | A1 * | 11/2019 | Richardson | A01K 85/02 |
| 2019/0380320 | A1 * | 12/2019 | Turner | A01K 83/06 |
| 2020/0000072 | A1 * | 1/2020 | Gonzalez | A01K 83/06 |
| 2021/0298279 | A1 * | 9/2021 | Graham | B29C 45/14065 |
| 2023/0363366 | A1 * | 11/2023 | Jackson | A01K 83/06 |

FOREIGN PATENT DOCUMENTS

| | | | | |
|---|---|---|---|---|
| GB | 2378113 | A * | 2/2003 | A01K 97/04 |
| GB | 2388289 | A * | 11/2003 | A01K 83/06 |
| JP | 2004201551 | A * | 7/2004 | |
| JP | 2006115747 | A * | 5/2006 | |
| JP | 3124637 | U | 8/2006 | |
| JP | 2006325468 | A * | 12/2006 | |
| JP | 2007053922 | A * | 3/2007 | |
| JP | 2007129999 | A * | 5/2007 | |
| JP | 2007292552 | A * | 11/2007 | |
| JP | 3150071 | U * | 4/2009 | |
| JP | 2010263881 | A * | 11/2010 | |
| JP | 5203595 | B2 * | 6/2013 | |
| JP | 3197937 | U * | 6/2015 | |
| JP | 2016119866 | A * | 7/2016 | |
| JP | 2018113923 | A * | 7/2018 | |
| JP | 3221188 | U * | 5/2019 | |
| JP | 3231606 | U * | 4/2021 | |
| JP | 2023023733 | A * | 2/2023 | A01K 85/1811 |
| KR | 20100087057 | A * | 8/2010 | |

* cited by examiner

FISHHOOK HOLDER

1. FIELD

The present disclosure relates to a fishhook holder.

2. Description of Related Art

Japanese Registered Utility Model No. 3231606 discloses a rig connection tool used for a soft lure (hereinafter referred to simply as "connection tool").

The connection tool includes a looped portion through which a fishhook is inserted, a body that is to be inserted into the soft lure, and a removal prevention member. The removal prevention member prevents the body that has been inserted into the soft lure from being removed toward the looped portion.

The looped portion is formed by bending a wire made of a metal material. The inner diameter of the looped portion is larger than the outer diameter of the fishhook. The looped portion is covered by a heat-shrinkable tube.

To use the connection tool, an angler first pierces the looped portion into the soft lure and exposes the looped portion from the soft lure. Then, the angler extends the fishhook through the heat-shrinkable tube and inserts the fishhook into the looped portion. In this manner, the fishhook is held against the connection tool.

The looped portion of the connection tool disclosed in the above-described literature is arcuate and has a larger width than the body. Thus, the soft lure into which the looped portion is pierced has a relatively large through-hole shaped in correspondence with the shape of the looped portion. The strength of the soft lure decreases around the through-hole. As a result, cracks easily occur in the soft lure. To prevent the occurrence of such cracking, the through-hole is preferably small. However, since the looped portion is formed by bending a metal material, there is a limit to reducing the size of the looped portion.

Additionally, since the looped portion of the connection tool disclosed in the above-described publication is arcuate, positioning of the connection tool relative to the soft lure is complicated during piercing of the looped portion into the soft lure. As a result, it is difficult to attach the connection tool to the soft lure with a suitable positional relationship between the connection tool and the soft lure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A fishhook holder according to an aspect of the present disclosure is configured to hold a fishhook against a soft lure and is made of a resin material. The fishhook holder includes a base configured to contact an outer surface of the soft lure, and a tapered shaft that protrudes from the base and is configured to extend through the soft lure. The shaft includes a basal end coupled to the base, a distal end located opposite the basal end in an axial direction of the shaft, an insertion hole located between the basal end and the distal end and configured such that the fishhook extends through the insertion hole, and a mark located between the insertion hole and the distal end. The mark indicates a reference position in a case where a portion including the distal end is cut off from the shaft.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A fishhook holder 10 according to an embodiment will now be described with reference to FIGS. 1 to 5.

Fishhook Holder 10

Figure 2:
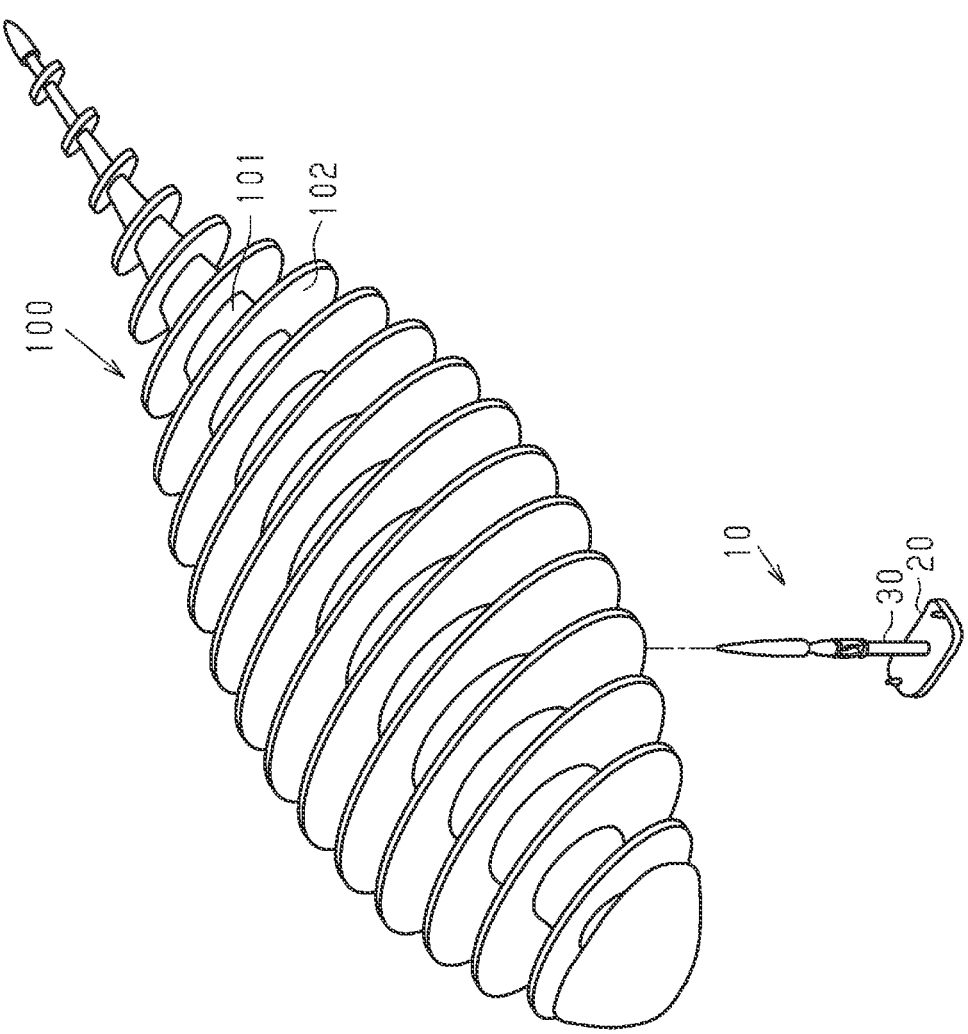
FIG. 2 is an exploded perspective view showing the fishhook holder and the soft lure.
Figure 1:
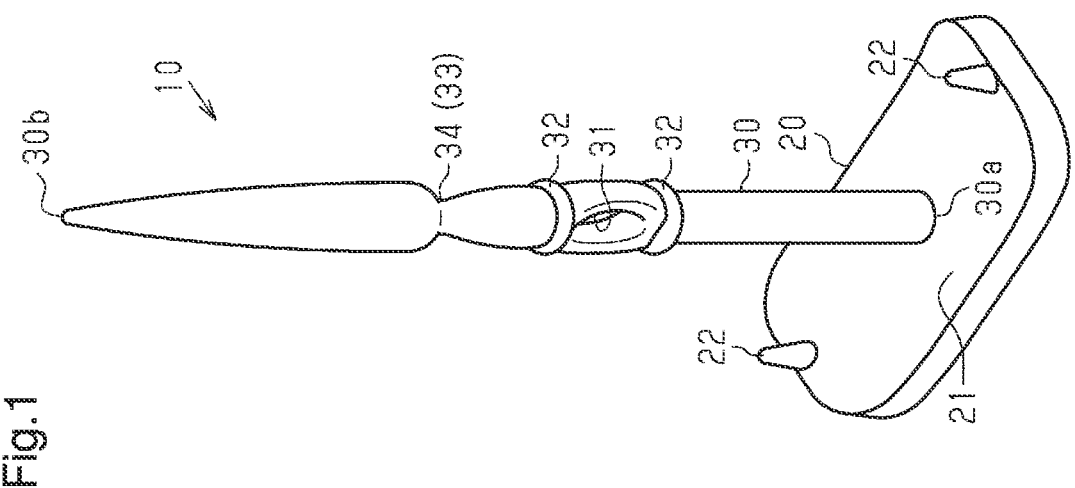
FIG. 1 is a perspective view showing a fishhook holder.

As shown in FIGS. 1 and 2, the fishhook holder 10 (hereinafter referred to simply as "holder 10") is used to hold a fishhook 201 (see FIG. 5) against a soft lure 100, which is an artificial bait.

As shown in FIG. 1, the holder 10 includes a base 20 and a shaft 30 that protrudes from the base 20. The base 20 and the shaft 30 are integrally formed. The holder 10 is made of a resin material, such as polypropylene (PP).

The axial direction of the shaft 30 is hereinafter referred to simply as the "axial direction."

Base 20

Figure 3:
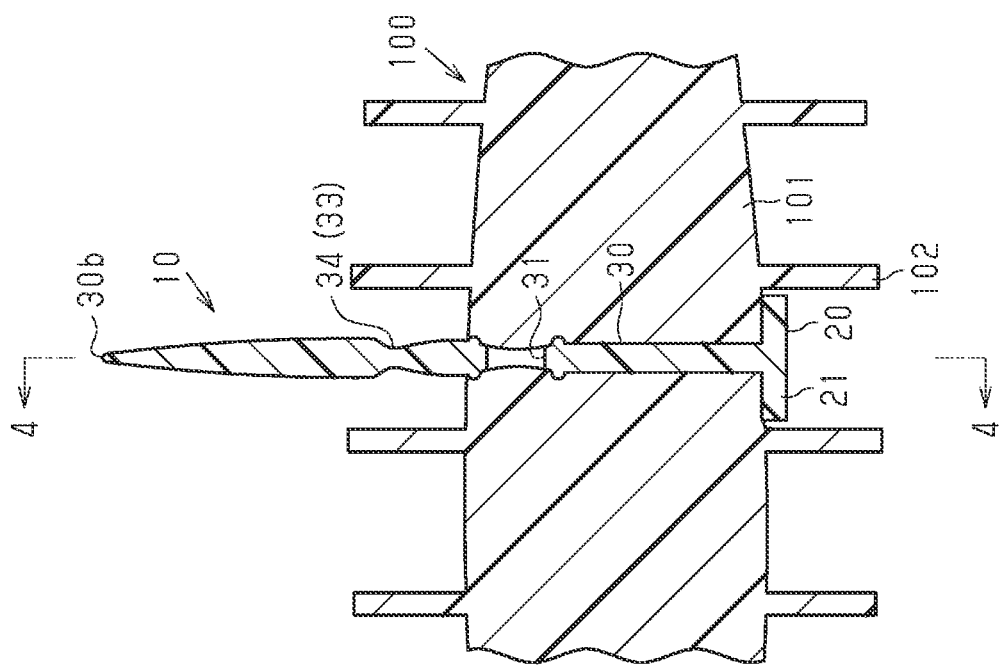
FIG. 3 is a cross-sectional view showing the fishhook holder pierced into the soft lure of FIG. 2.
Figure 4:
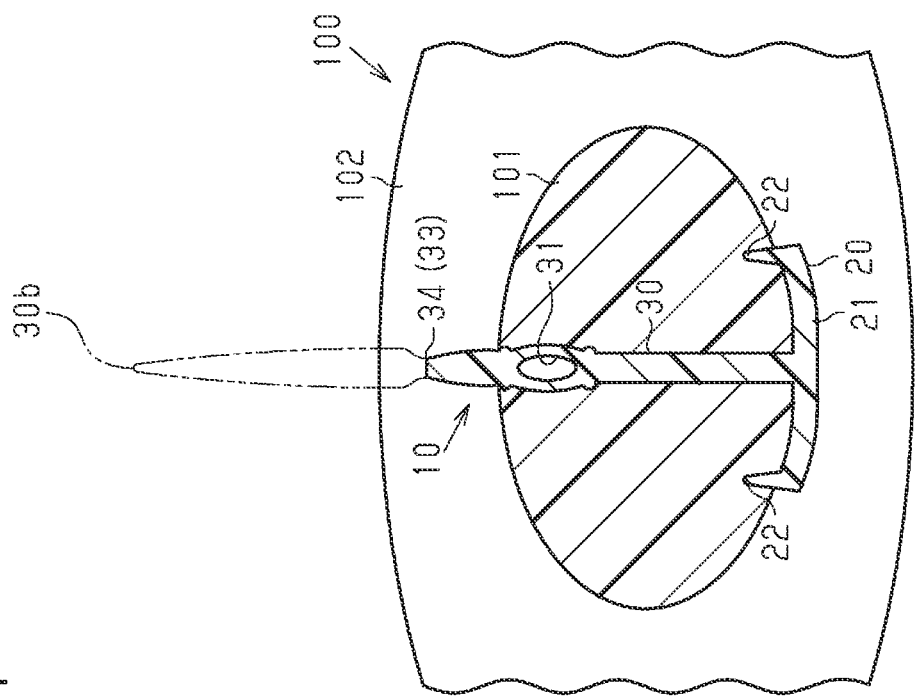
FIG. 4 is a cross-sectional view taken along line 4-4 in FIG. 3, showing a state in which part of the shaft of the fishhook holder is cut off.

As shown in FIGS. 1, 3, and 4, the base 20 includes a base body 21 and protrusions 22 that protrude from the base body 21. The base 20 includes, for example, two protrusions 22. The base body 21 is configured to contact the outer surface of the soft lure 100. Each protrusion 22 is configured to be embedded in the soft lure 100.

The base body 21 has a plate shape. More specifically, the base body 21 has a rectangular shape with long sides and short sides. The base body 21 is curved in an arcuate manner such that the two side portions of the base body 21 in the long-side direction are displaced in the protruding direction of the shaft 30. Thus, the shaft 30 protrudes from the arcuate recessed surface of the base body 21.

From the opposite ends of the base body 21 in the long-side direction, the two protrusions 22 protrude in a direction identical to the protruding direction of the shaft 30. The two protrusions 22 are located on the opposite sides of the shaft 30. Each protrusion 22 is tapered.

Shaft 30

The shaft 30 is configured to extend through the soft lure 100. The shaft 30 protrudes from the middle of the base body 21. The shaft 30 is tapered. The entire shaft 30 is substantially cylindrical.

As shown in FIG. 1, the shaft 30 includes a basal end 30a coupled to the base body 21 and a distal end 30b located opposite the basal end 30a in the axial direction.

The shaft 30 includes an insertion hole 31. The insertion hole 31 is configured such that the fishhook 201 (see FIG. 5) is inserted through the insertion hole 31. The insertion hole 31 is located between the basal end 30a and the distal end 30b. The insertion hole 31 extends through the shaft 30 in a direction that is orthogonal to the axial direction of the shaft 30. The axial direction of the insertion hole 31, that is, the opening direction of the insertion hole 31 coincides with the short-side direction of the base body 21. When seen from the front, the insertion hole 31 has an oval shape extending in the axial direction of the shaft 30.

The shaft 30 includes two annular portions 32 located on the opposite sides of the insertion hole 31 in the axial direction. Each annular portion 32 protrudes from the outer circumference of the shaft 30 and extends over the entire circumference of the shaft 30.

The shaft 30 includes a mark 33 located between the insertion hole 31 and the distal end 30b. The mark 33 indicates a reference position in a case where a portion including the distal end 30b is cut off from the shaft 30.

The mark 33 is a constriction 34 that is narrower than a portion adjacent to the mark 33 in the axial direction. The constriction 34 has a smaller diameter than the portion adjacent to the constriction 34. Since the constriction 34 is thinner than the portion adjacent to the constriction 34, the constriction 34 is more fragile than that portion. That is, the constriction 34 is a fragile portion.

Method for Using Holder 10

A method for using the holder 10 will now be described.

First, an example of the soft lure 100 to which the holder 10 is applied will now be described.

As shown in FIG. 2, the soft lure 100 has a flat shape resembling, for example, the shape of fish. The soft lure 100 includes a cylindrical body 101 and ribs 102 that protrude from the outer circumference of the body 101.

The cross-sectional shape orthogonal to the longitudinal direction of the body 101 (see FIG. 4) is, for example, oval. The ribs 102 are spaced apart from each other in the longitudinal direction of the body 101. Each rib 102 extends over the entire circumference of the body 101. Thus, the soft lure 100 has a bellows shape.

To facilitate understanding, the major-axis direction and minor-axis direction in the cross-sectional shape of the body 101 (see FIG. 4) are hereinafter referred to simply as the "major-axis direction" and "minor-axis direction," respectively. In addition, the front side and rear side of the soft lure 100 are referred to simply as the "front side" and "rear side," respectively. The longitudinal direction, major-axis direction, and minor-axis direction of the body 101 are orthogonal to each other.

As shown in FIGS. 3 and 4, to attach the holder 10 to the soft lure 100, the shaft 30 is pierced into the outer surface of the body 101 so that the shaft 30 extends through the body 101. The shaft 30 extends through a section of the body 101 between two ribs 102 adjacent to each other. The shaft 30 extends through the body 101 in the minor-axis direction.

Next, the holder 10 is pressed against the soft lure 100 until the base body 21 contacts the outer surface of the body 101. At this time, the long-side direction of the base body 21 preferably coincides with the major-axis direction. In other words, the opening direction of the insertion hole 31 preferably coincides with the longitudinal direction of the body 101. At this time, the base 20 prevents the holder 10 from being removed from the soft lure 100.

As shown in FIG. 4, after the base body 21 is pressed so as to contact the outer surface of the body 101, the two protrusions 22 are pierced into the body 101. This causes the two protrusions 22 to be embedded into the body 101.

In a state where the base body 21 is in contact with the outer surface of the body 101, a portion of the shaft 30 including the insertion hole 31 is located in the body 101. The mark 33 is located outside of the body 101 and between two ribs 102 adjacent to each other.

Subsequently, the portion including the distal end 30b is cut off from the shaft 30 using a cutting tool (not shown) at the position of the mark 33. In FIG. 4, the broken line shows the portion that has been cut off from the shaft 30.

Figure 5:
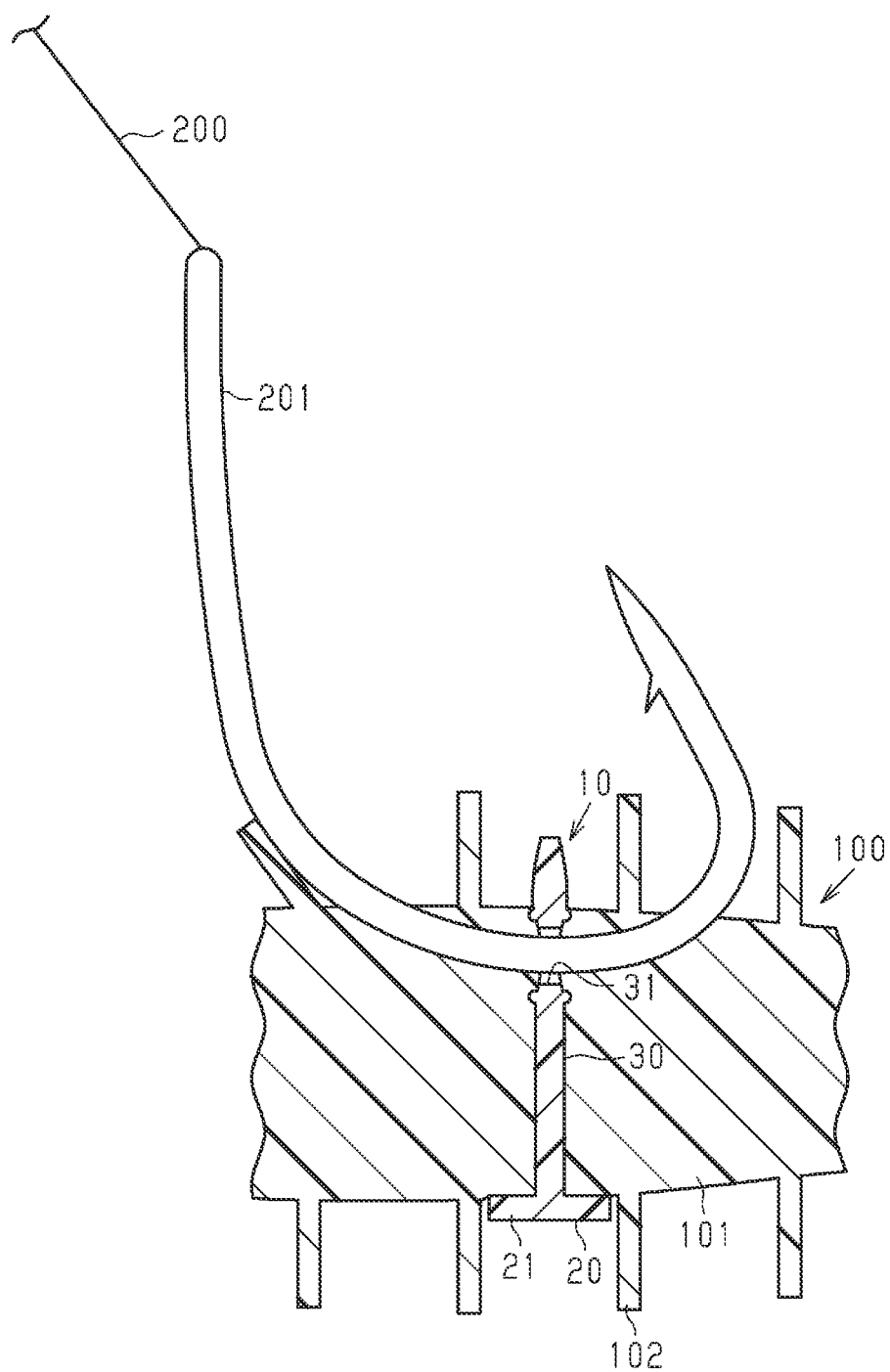
FIG. 5 is a cross-sectional view showing a state in which the fishhook is inserted through the insertion hole of the fishhook holder of FIG. 4.

Next, as shown in FIG. 5, the fishhook 201 to which a fishing line 200 is tied is pierced into a portion of the body 101 located frontward from the holder 10 and inserted through the insertion hole 31.

Then, the tip of the fishhook 201 is exposed from a portion of the body 101 located rearward from the holder 10.

In the manner described above, the fishhook 201 is extended through the body 101 and inserted through the insertion hole 31. This allows the fishhook 201 to be held against the soft lure 100.

The operation of the present embodiment will now be described.

Piercing the shaft 30 into the soft lure 100 causes the portion of the shaft 30 including the distal end 30b to be exposed to the outside of the soft lure 100. In this state, the portion including the distal end 30b is cut off from the shaft 30 at the position of the mark 33 using a cutting tool or the like. Then, the fishhook 201 is inserted through the insertion hole 31 so that the fishhook 201 is held against the soft lure 100 using the holder 10.

The advantages of the present embodiment will now be described.

(1) The holder 10 is made of resin and includes the base 20 and the tapered shaft 30. The base 20 is configured to contact the outer surface of the soft lure 100. The shaft 30 protrudes from the base 20 and is configured to extend through the soft lure 100. The shaft 30 includes the basal end 30a, coupled to the base 20, and the distal end 30b, located opposite the basal end 30a in the axial direction. The shaft 30 includes the insertion hole 31 located between the basal end 30a and the distal end 30b and configured such that the fishhook 201 is inserted through the insertion hole 31. The shaft 30 includes the mark 33. The mark 33 is located between the insertion hole 31 and the distal end 30b and indicates a reference position in a case where the portion including the distal end 30b is cut off from the shaft 30.

In such a structure, the tapered shape of the shaft 30 allows an angler to easily visually check the direction in which the shaft 30 is pierced into the soft lure 100. This allows the angler to easily attach the holder 10 to the soft lure 100 with a suitable positional relationship between the holder 10 and the soft lure 100.

In the above-described structure, since the holder 10 is made of resin, the portion of the shaft 30 including the insertion hole 31 is reduced in width. In addition, the shaft 30 is tapered. These features reduce the size of a hole that is produced in the soft lure 100 by piercing the shaft 30.

In the above-described structure, the size (maximum width) of the insertion hole 31 is set to be slightly smaller than the outer diameter of the fishhook 201. Thus, when the fishhook 201 is inserted through the insertion hole 31, the shaft 30 elastically deforms such that the insertion hole 31 expands. The shaft 30 produces a restoring force that presses the inner surface of the insertion hole 31 against the fishhook 201. This improves the force of the holder 10 holding the fishhook 201.

In the above-described structure, when the portion including the distal end 30b is cut off from the shaft 30, the protruding amount of the shaft 30 from the soft lure 100 becomes smaller. This limits the interference of the shaft 30 with the fishhook 201 or the angler's hand and reduces the discomfort to fish during the use of the soft lure 100.

(2) The mark 33 is the constriction 34 that is narrower than the portion adjacent to the mark 33 in the axial direction.

Since the mark 33 is the constriction 34, such a structure allows an angler to easily visually check the mark 33 and allows the blade tip of a cutting tool to be easily positioned to the mark 33. Thus, the angler easily cuts off the portion including the distal end 30b from the shaft 30 at the position of the mark 33.

(3) The base 20 includes the base body 21 and the two protrusions 22 that protrude from the base body 21. Each protrusion 22 protrudes in the direction identical to the protruding direction of the shaft 30 from the base body 21, and is configured to be embedded in the soft lure 100.

In such a structure, an angler easily pierces the shaft 30 into the soft lure 100 by pressing the base body 21 toward the outer surface of the soft lure 100. Further, at this time, the protrusions 22 are embedded in the soft lure 100. This limits rotation of the holder 10 with respect to the shaft 30 relative to the soft lure 100, and accordingly allows the fishhook 201 to be properly positioned relative to the soft lure 100.

(4) The base body 21 has a rectangular shape with long sides and short sides.

In such a structure, when using the holder 10 for the soft lure 100, an angler easily arranges the base 20 between two ribs 102 adjacent to each other by coinciding the short-side direction of the base body 21 with the longitudinal direction of the body 101. By locating the base 20 between the two ribs 102, the base 20 is hard to visually check. This reduces the discomfort to fish.

(5) The opening direction of the insertion hole 31 coincides with the short-side direction of the base body 21.

Such a structure allows an angler to estimate the opening direction of the insertion hole 31 by checking the orientation of the base body 21. Thus, the fishhook 201 is easily inserted into the insertion hole 31, which is located in the body 101.

Modifications

The present embodiment may be modified as follows. The present embodiment and the following modifications can be combined as long as they remain technically consistent with each other.

The opening direction of the insertion hole 31 may coincide with the long-side direction of the base body 21. In this case, in the holder 10 attached to the soft lure 100, the opening direction of the insertion hole 31 coincides with the major-axis direction of the body 101. Thus, the fishhook 201 extends through the body 101 in the major-axis direction.

The base body 21 does not have to be curved. Instead, the base body 21 may have, for example, a flat shape extending planarly.

The base body 21 may have the shape of a circular plate or a polygonal plate.

The base body 21 may include a mark that indicates the opening direction of the insertion hole 31.

The base 20 may include one protrusion 22 or may include three or more protrusions 22.

The base 20 does not have to include the protrusions 22.

The mark 33 may be, for example, a groove, a protrusion, a pattern, or a colored portion provided on the outer surface of the shaft 30. In other words, the mark 33 simply needs to be visually checked by an angler.

In a state where the fishhook 201 is not inserted through the insertion hole 31, the insertion hole 31 does not have to extend through the shaft 30. For example, the insertion hole 31 may be closed by a film that is integrated with or separate from the shaft 30. In this case, when the fishhook 201 extends through the film, the fishhook 201 is inserted through the insertion hole 31.

The holder 10 may be applied to various types of soft lures that are different from the soft lure 100. The positional relationship between the holder 10 and the soft lure may be changed by an angler.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A fishhook holder configured to hold a fishhook against a soft lure and made of a resin material, the fishhook holder comprising:
   a base comprising a surface configured to contact an outer surface of the soft lure; and
   a tapered shaft that protrudes from the base in a direction perpendicular to the surface and is configured to extend through the soft lure, wherein
   the shaft includes:
      a basal end coupled to the base;
      a distal end located opposite the basal end in an axial direction of the shaft;
      an insertion hole located between the basal end and the distal end and configured such that the fishhook extends through the insertion hole when the fishhook holder holds the fishhook; and
      a mark located between the insertion hole and the distal end, the mark indicating a reference position in a case where a portion of the shaft including the distal end is cut off from the shaft,
   the insertion hole and the mark are located on an axis of the shaft, and a length of a portion of the shaft between the base and the insertion hole is greater than a length of a portion of the shaft between the insertion hole and the mark.

2. The fishhook holder according to claim 1, wherein the mark is a constriction that is narrower than portions of the shaft adjacent to the mark on both sides of the mark in the axial direction of the shaft, and a length of a portion of the shaft between the mark and the distal end is greater than the length of the portion of the shaft between the insertion hole and the mark.

3. The fishhook holder according to claim 1, wherein the mark is a fragile portion that is more fragile than portions of the shaft adjacent to the mark on both sides of the mark in the axial direction of the shaft.

4. The fishhook holder according to claim 1, wherein the base includes:
   a plate-shaped base body; and
   a protrusion that protrudes from the base body, and
   the protrusion protrudes in a direction identical to a direction in which the shaft protrudes from the base body and configured to be embedded in the soft lure.

5. The fishhook holder according to claim 1, wherein the insertion hole has a maximum width that is smaller than an outer diameter of the fishhook.

6. A fishhook holder configured to hold a fishhook against a soft lure and made of a resin material, the fishhook holder comprising:
   a base configured to contact an outer surface of the soft lure; and
   a tapered shaft that protrudes from the base and is configured to extend through the soft lure, wherein
   the base includes:
      a plate-shaped base body; and
      a protrusion that protrudes from the base body, and
   the protrusion protrudes in a direction identical to a direction in which the shaft protrudes from the base body and configured to be embedded in the soft lure,
   the shaft includes:
      a basal end coupled to the base;
      a distal end located opposite the basal end in an axial direction of the shaft;
      an insertion hole located between the basal end and the distal end and configured such that the fishhook extends through the insertion hole when the fishhook holder holds the fishhook; and
      a mark located between the insertion hole and the distal end, the mark indicating a reference position in a case where a portion of the shaft including the distal end is cut off from the shaft,
   the insertion hole and the mark are located on an axis of the shaft, and
   a length of a portion of the shaft between the base and the insertion hole is greater than a length of a portion of the shaft between the insertion hole and the mark.

7. The fishhook holder according to claim 6, wherein the mark is a constriction that is narrower than a portion of the shaft adjacent to the mark in the axial direction of the shaft.

8. The fishhook holder according to claim 6, wherein the mark is a fragile portion that is more fragile than a portion of the shaft adjacent to the mark in the axial direction of the shaft.

9. The fishhook holder according to claim 6, wherein the insertion hole has a maximum width that is smaller than an outer diameter of the fishhook.

* * * * *